(12) United States Patent
Ceccarelli et al.

(10) Patent No.: US 10,122,616 B2
(45) Date of Patent: Nov. 6, 2018

(54) METHOD AND APPARATUS FOR LOCAL PATH PROTECTION

(71) Applicant: Telefonaktiebolaget L M Ericsson (publ), Stockholm (SE)

(72) Inventors: Daniele Ceccarelli, Genoa (IT); Giulio Bottari, Genoa (IT); Diego Caviglia, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 258 days.

(21) Appl. No.: 14/904,238

(22) PCT Filed: Jul. 19, 2013

(86) PCT No.: PCT/EP2013/065345
§ 371 (c)(1),
(2) Date: Jan. 11, 2016

(87) PCT Pub. No.: WO2015/007346
PCT Pub. Date: Jan. 22, 2015

(65) Prior Publication Data
US 2016/0156546 A1    Jun. 2, 2016

(51) Int. Cl.
*H04B 10/00* (2013.01)
*H04L 12/707* (2013.01)
(Continued)

(52) U.S. Cl.
CPC .......... *H04L 45/22* (2013.01); *H04J 14/0258* (2013.01); *H04J 14/0275* (2013.01);
(Continued)

(58) Field of Classification Search
CPC ......... H04L 45/22; H04L 45/28; H04L 45/50; H04J 14/0258; H04J 14/0275;
(Continued)

(56) References Cited

U.S. PATENT DOCUMENTS

| 6,917,759 B2 * | 7/2005 | de Boer | H04J 3/085 398/5 |
| 7,046,619 B2 * | 5/2006 | Alagar | H04J 14/0227 370/216 |

(Continued)

FOREIGN PATENT DOCUMENTS

| EP | 2 466 785 A1 | 6/2012 |
| WO | 2013/152806 A1 | 10/2013 |

OTHER PUBLICATIONS

D. Awduche et al., "RSVP-TE: Extensions to RSVP for LSP Tunnels", Network Working Group, Request for Comments: 3209, Dec. 2001, pp. 1-61.

(Continued)

*Primary Examiner* — Hibret Woldekidan
(74) *Attorney, Agent, or Firm* — Nicholson De Vos Webster & Elliott LLP

(57) ABSTRACT

A method of local path protection in a node on a shared alternative path of a network. The method comprising receiving a signal switched on a primary label switched path (LSP). The signal is switched by lambda-switching or time-division multiplex TDM switching. The method further comprises receiving identification information arranged to identify the signal, and forwarding the signal on the alternative path based on the identification information.

21 Claims, 5 Drawing Sheets

(51) Int. Cl.
*H04J 14/02* (2006.01)
*H04Q 11/00* (2006.01)
*H04L 12/703* (2013.01)
*H04L 12/723* (2013.01)

(52) U.S. Cl.
CPC .......... *H04J 14/0295* (2013.01); *H04L 45/28* (2013.01); *H04Q 11/0066* (2013.01); *H04L 45/50* (2013.01); *H04Q 2011/0016* (2013.01); *H04Q 2011/0033* (2013.01); *H04Q 2011/0077* (2013.01); *H04Q 2011/0081* (2013.01)

(58) Field of Classification Search
CPC ............... H04J 14/0295; H04J 14/0227; H04J 14/0291; H04J 14/0293; H04Q 11/0066; H04Q 2011/0016; H04Q 2011/0033; H04Q 2011/0077; H04Q 2011/0081; H04Q 11/0005; H04B 10/032; H04B 10/03; H04B 10/038
USPC .................. 398/52, 57, 45, 47, 48, 2, 5, 7, 9
See application file for complete search history.

(56) References Cited

U.S. PATENT DOCUMENTS

| | | | | |
|---|---|---|---|---|
| 7,450,497 | B2* | 11/2008 | Trudel | H04J 3/085 370/224 |
| 7,460,469 | B2* | 12/2008 | Goldberg | H04J 3/14 370/218 |
| 7,765,303 | B2* | 7/2010 | Geoffrion | H04L 29/06 709/227 |
| 9,432,749 | B2* | 8/2016 | Hironaka | H04Q 11/0005 |
| 9,602,194 | B2* | 3/2017 | Miyabe | H04B 10/032 |
| 9,621,452 | B2* | 4/2017 | Bamba | H04L 45/22 |
| 2004/0179472 | A1 | 9/2004 | Khalilzadeh et al. | |
| 2009/0103533 | A1* | 4/2009 | Li | H04L 41/0226 370/389 |
| 2012/0155327 | A1* | 6/2012 | Fondelli | H04L 41/0816 370/254 |
| 2012/0163803 | A1* | 6/2012 | Zi | H04J 3/14 398/17 |
| 2014/0156751 | A1* | 6/2014 | Bardalai | H04L 45/22 709/204 |

OTHER PUBLICATIONS

"Series G: Transmission Sytems and Media, Digital Systems and Networks; Transmission media characteristics —Characteristics of optical components and subsystems", ITU-T, Telecommunication Standardization Sector of ITU, G.692 Corrigendum 2, (Jun. 2002), 10 pages.

International Search Report for Application No. PCT/EP2013/065345, dated Sep. 17, 2013, 3 pages.

Ping Pan et al., "Past Reroute Extensions to RSVP-TE for LSP Tunnels; draft-ieff-mpls-rsvp-lsp-fastreroute-03.txt", Internet Engineering Task Force, IETF, Dec. 1, 2003, pp. 1-35.

D. Papadimitriou et al., "Analysis of Generalized Multi-Protocol Label Switching (GMPLS)-based Recovery Mechanisms (including Protection and Restoration)", Network Working Group, Request for Comments: 4428, Mar. 1, 2006, pp. 1-47.

International Preliminary Report on Patentability for Application No. PCT/EP2013/065345, dated Jan. 28, 2016, 7 pages.

Written Opinion for Application No. PCT/EP2013/065345, dated Sep. 17, 2013, 5 pages.

* cited by examiner

METHOD AND APPARATUS FOR LOCAL PATH PROTECTION

CROSS-REFERENCE TO RELATED APPLICATIONS

This application is a National stage of International Application No. PCT/EP2013/065345, filed Jul. 19, 2013, which is hereby incorporated by reference.

TECHNICAL FIELD

Aspects of the invention relate to a method and apparatus for network local recovery. In particular, aspects relate to local path protection in an optical network

BACKGROUND

Transport networks are known to have the capability of providing dynamic recovery mechanisms able, in case of failure, to protect the traffic. In particular, the protection is provided within a short time frame.

Many wavelength division multiplexed (WDM) control plane implementations are based on distributed signaling and a centralized Path Computation Element (PCE). As soon as a failure occurs, the ingress nodes of the optical Label Switched Paths (LSP) impacted by the failure ask the centralized PCE for the computation of an alternative path. The communication between the ingress nodes and the PCE is an extremely critical issue, as a delay in the communication between them highly impacts restoration time.

For optical LSP, a signaling protocol of a control plane can be used by ingress nodes to set up a protection path. This requires use of a signaling protocol.

Packet networks (e.g. IP/MPLS) are able to provide pre-provisioned protection schemes (e.g. Fast Re-routing—FRR) where forwarding tables can be preconfigured and, in case of failure, local protection decisions can be made depending on the header of the incoming packet.

FIG. 1 shows a prior art example of local recovery in a packet switched network 100. Packets 110 include identification data in the Internet Protocol (IP) packet overhead or in a multi-protocol label switching (MPLS) label 111 to inform nodes crossed about the destination of the packet. In particular, for a label switched path (LSP), the packet label 111 informs all the nodes crossed about the destination of the LSP. In this case, a primary LSP 102 originates at node A 122, then node B 124, node C 126 and terminates at node D 128. Nodes B and C 124,126 can be configured to provide local protection to the packet network (e.g. IP/MPLS). In the example shown, a link B-C 103 between nodes B and C is broken. Node B 124 is configured to send the traffic towards node F 132 along a protection path 106.

The node B is configured to apply a different label to indicate the alternative path. The packets are forwarded to node G 134 and then to node C 126 using the alternative path label. Node C 126 is configured so that incoming traffic with the primary (working) path label 102 and incoming traffic from node G 134 with the alternative (detour) path label 106 are handled in the same way, in particular, forwarded to node D 128 with the primary path label. The packet header 111 can contain the label for the primary path 102 and the label for the alternative path 106. Only the outer label is used for switching, such that the label for the alternative path 106 is exclusively used on the alternative path. Switching can be carried out with the same procedure on both the primary and alternative paths, with the labels read from a header. The label for the alternative path is then removed from the packet. Lambda-switched optical transport, for example, cannot add an additional label in this manner.

SUMMARY

A first aspect of the present invention provides a method of local path protection in a node on a shared alternative path of a network. The method comprises receiving a signal previously on a primary label switched path LSP. The signal is switched by lambda-switching or time-division multiplex TDM switching. The method comprises receiving identification information arranged to identify the signal, and forwarding the signal on the alternative path based on the identification information.

A second aspect of the present invention provides a method of local path protection in a node on a primary path of a network. The method comprises receiving a signal switched on the primary label switched path LSP. The signal is switched by lambda-switching or time-division multiplex TDM switching. The method further comprises determining that the signal is to be sent on an alternative path, and forwarding on the alternative path the signal and identification information arranged to identify the signal.

Thus, local path protection can be shared between separate primary paths. For example, the same primary LSP (e.g. lambda) can be used on each primary path, and use a shared alternative path. The protection is provided without a control plane.

A third aspect of the present invention provides a node configured for an alternative path of a network. The node comprises an input interface configured to receive a signal previously switched on a primary label switched path LSP. The signal is switched by lambda-switching or time-division multiplex TDM switching. An output interface is configured to forward the signal on the alternative path. A receive module configured to receive identification information arranged to identify the signal. The node is configured to select the output interface based on the identification information.

A fourth aspect of the present invention provides a node configured for a primary path of a network. The node comprises an input interface configured to receive a signal switched with a label switched path LSP. The node is configured to determine identification information of the signal. An output interface is configured to transmit the signal and identification information on the alternative path.

Any of the features of any embodiment can be combined together and combined with any of the aspects.

BRIEF DESCRIPTION OF THE DRAWINGS

Embodiments of the invention will be described, by way of example only, with reference to the accompanying drawings, in which.

DETAILED DESCRIPTION

Figure 1:
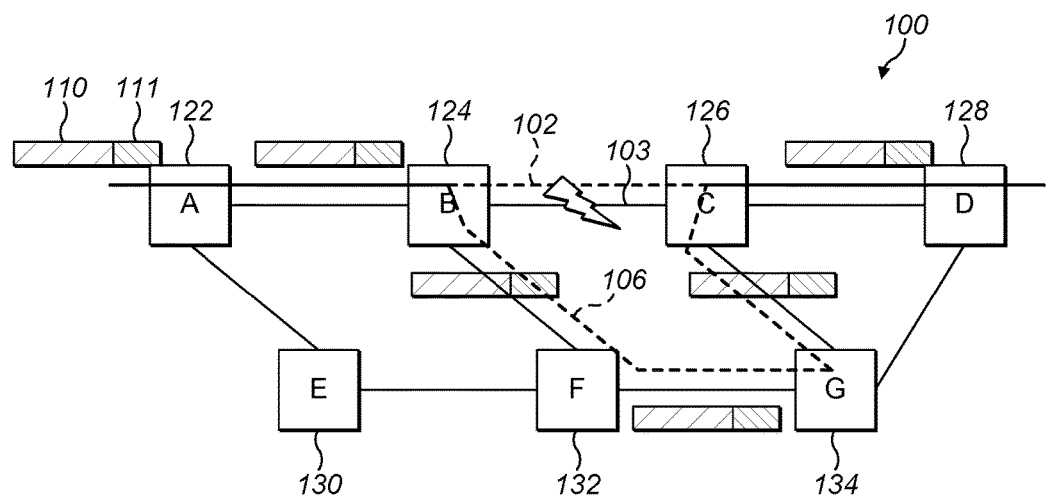
FIG. 1 shows a prior art network showing an example of local recovery in a packet network.

An aspect of the present invention relates to a method and apparatus for a local recovery mechanism in a network. Aspects of the invention relate to local path protection in a network. In some examples, the network is an optical network. The network carries traffic between nodes or network elements. Examples of nodes (or network elements) include switches, (random) add/drop multiplexors, optical cross-connects, photonic cross-connects, random optical add/drop multiplexors (ROADMs), OTN switches, digital cross-connects, switching fabric, or routers (e.g. label switching routers). In an optical network, the nodes are connected by one or more optical fibers. Aspects of the invention provide local transport path protection, in particular, shared local transport path protection.

In some aspects of the invention, the network is an optical network which is wavelength or lambda switched. An optical signal comprises a plurality of light wavelengths, which are wavelength division multiplexed (WDM). The network is similar to a Generalised Multi-Protocol Label Switching (GMPLS) network, although without requiring a control plane. Each wavelength can be termed as a lambda, and aspects of the invention relate to a lambda switched network. In this case, the lambda is the label in label switched paths (LSP). A lambda is an example of a signal, and other types of signal will be described.

The transport network and nodes provide for label switching of traffic along LSPs. A LSP comprises a set of cross-connections, one for each node along the path.

Aspects of the invention provide for one or more types of switching ability: lambda-switch capable (LSC), or time-division multiplex capable (TDM). Aspects of the invention are applicable to lambda-switching and time-division multiplex switching. The examples below relate to lambda switching. The same features are applicable to TDM switching. For example, switching of a LSP in TDM switching is by a timeslot or a time-division multiplexed data unit. The term lambda may be replaced with signal or other term to cover all embodiments described.

A LSC interface executes the data transmission task according to the wavelength inside the optical fiber through which data is transmitted. In the lambda (λ) layer, the label corresponds to the wavelength. As an example of a lambda interface, a node according to an aspect of the invention comprises an optical cross-connect interface in which the lambda path is formed by connecting the wavelength assigned to the input side and the one assigned to the output side. The node is configured to switch a particular wavelength from an input port to an output port, the determined output port based on the wavelength of the signal. Therefore, different wavelengths may take at least partially different routes through the optical network. The nodes are configured to maintain the same wavelength or select a different wavelength to output the signal. The node executes switching by wavelength unit. Similarly, a TDM executes switching by time slot unit.

Figure 2:
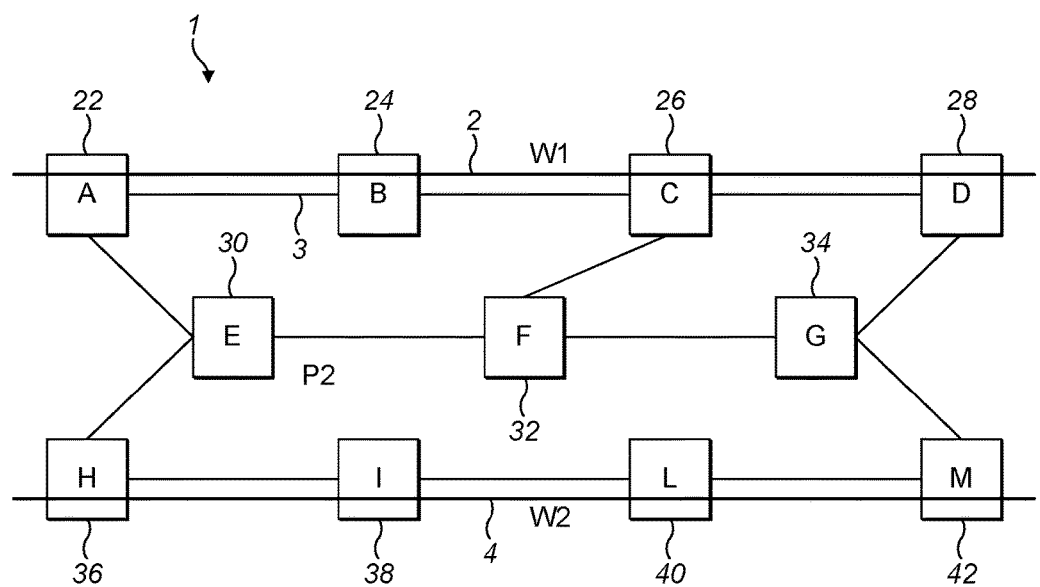
FIG. 2 shows a network according to an example of the present invention.

FIG. 2 shows an example network 1 according to an aspect of the invention, comprising a plurality of nodes A to M connected by links. The nodes A to M are formed in a mesh network. The network is an optical network. The network 1 is configured to carry a plurality of lightpaths. A lightpath can be considered as an optical end-to-end connection or an optical LSP. In some aspects, the lightpaths are wavelength division multiplexed. A first lightpath 2 (worker W1) has a primary path from node A 22 to node D 28, via node B 24 and node C 26, (i.e. A-B-C-D). A second lightpath 4 (worker W2) has a primary path from node H 36 to node M 42, via node I 38 and node L 40 (i.e. H-I-L-M). The first and second lightpaths 2,4 both carry WDM optical signals. In particular, the first and second lightpaths 2,4 at least partially overlap in the wavelengths of light transmitted. The first and second lightpaths utilise at least some of the same wavelengths, i.e. lambda sharing. The primary paths of the first and second lightpaths 2,4 are separate, e.g. switched by different nodes. The optical signals are lambda switched along the LSP, the wavelength of light of the optical signal providing the label.

Figure 3:
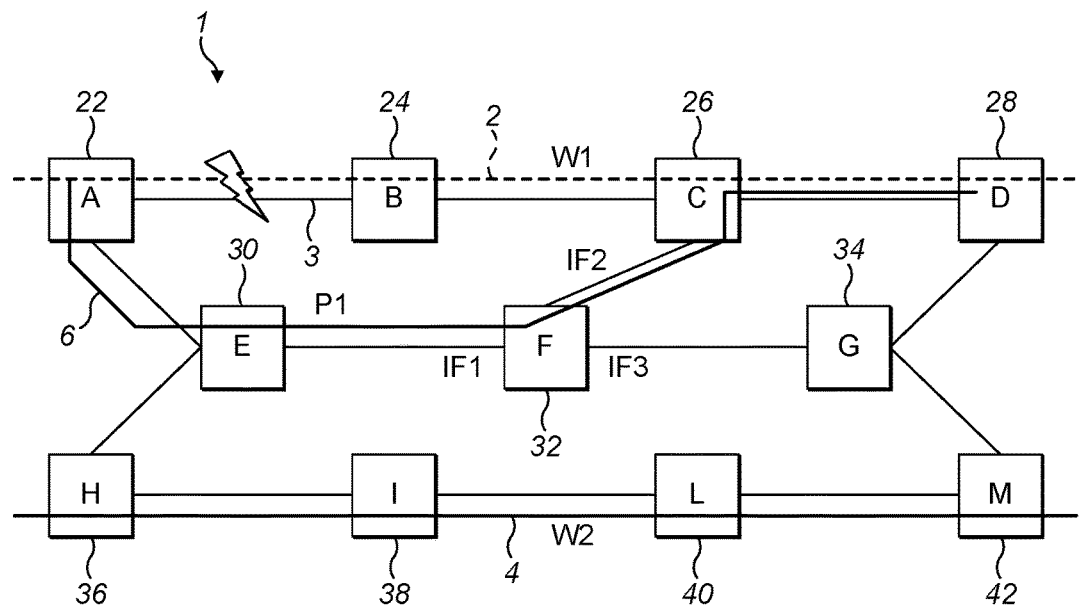
FIG. 3 shows a network according to an example of the present invention with a resiliency mechanism handling a first failure.

FIG. 3 shows an exemplary first alternative, or protection, path 6 in the network 1 for a first lightpath 2. The first alternative path 6 for the first lightpath 2 is due to an example failure affecting the first lightpath, for example, a communication failure between node A 22 and node B 24. The failure may be due to a link A-B 3 failing (e.g. due to a fiber being mechanically cut), or due to the connection of the link 3 to node A 22 or node B 24 failing. The first lightpath 2 is affected by the failure, the second lightpath 4 is not affected by the failure. When the failure is detected, the node A of the first lightpath 2 is configured to switch all of the WDM signals onto the first alternative path 6. In some examples, the protection path is initiated by the node immediately upstream of the failure 3.

The first alternative path 6 is from node A 22 to node E 30, then to node F 32, then to node C 26. From node C the first alternative path 6 is the same as the first primary path 2 to node D 28. Therefore, the first alternative path is A-E-F-C-D, which avoids the failed link A-B 3.

Figure 4:
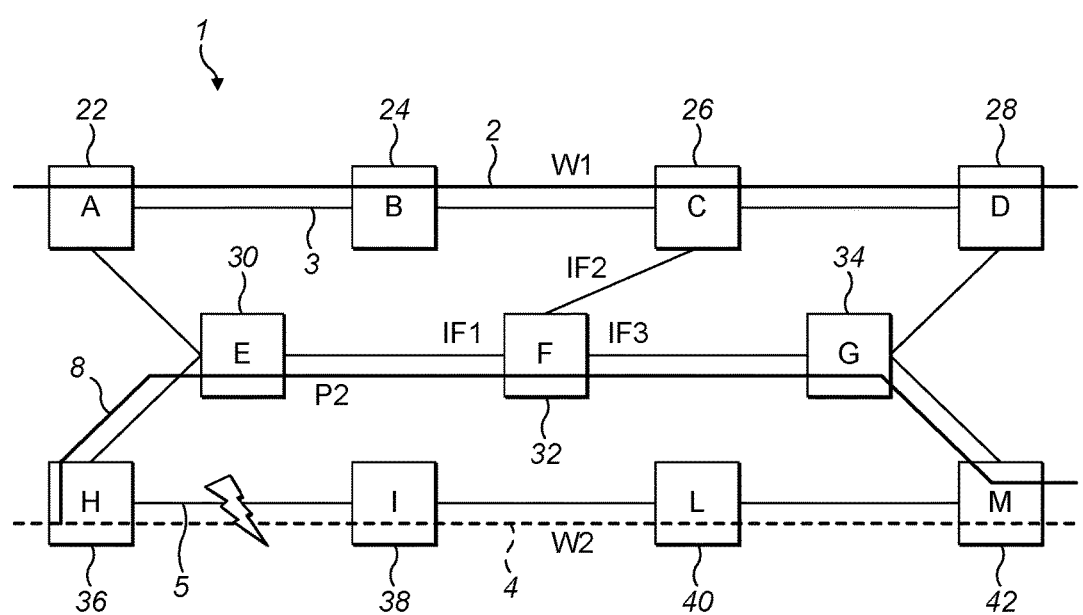
FIG. 4 shows a network according to an example of the present invention with a resiliency mechanism handling a second failure.

FIG. 4 shows an exemplary second alternative, or protection, path 8 in the network 1 for the second lightpath 4. The second alternative path 8 for the second lightpath is due to an example failure affecting the second lightpath, for example, a communication failure between node H and node I. The failure may be due to the link H-I 5 failing (e.g. due to a fiber being mechanically cut), or due to the connection of the link to node H or node I failing. The second lightpath 4 is affected by the failure, and the first lightpath 2 is not affected by the failure. When the failure is detected, the node A of the second lightpath 4 is configured to switch all of the WDM optical signals onto the second alternative path 8. In some examples, the protection path is initiated by the node immediately upstream of the failure 5.

The second alternative path 8 is from node H to node E, then to node F, then to node G. From node G the second alternative path joins the second primary path at node M. Therefore, the second alternative path is H-E-F-G-M, which avoids the failed link H-I.

The first and second alternative paths 6,8 are at least partially shared by the first and second lightpaths 2,4. In particular, at least one node 30,32 is part of the first and second alternative paths. For convenience, the at least partially shared alternative path will be referred to as a shared alternative path 6,8. The sharing of alternative paths avoids the need to have separate alternative paths, and so reduces the resources required to provide an alternative path for the first and second lightpaths 2,4.

The first and second alternative paths 6,8 are label switched paths. In some aspects, the signal is switched by lambda-switching or time-division multiplex TDM switching.

The signal is switched by one of lambda-switching or TDM switching on both the primary and alternative paths.

Only one of the first and second primary paths 6,8 may utilise the shared alternative path at a particular time. The nodes on the shared alternative path, i.e. shared nodes 30,32, will route traffic on either the first alternative path or the second alternative path.

Although only one of the first and second primary paths 6,8 is present on the shared alternate path, a prior art network would not be able to implement the shared alternative path without using distributed signalling or a control plane. Aspects of the present invention relate to shared protection for wavelength switched optical paths without such a control plane. For example, any control plane does not comprise a distributed signalling protocol providing local recovery.

The applicant has determined that shared protection for the primary paths 2,4 can be achieved by providing an identification of the label switched paths. The identification or identifier is provided by identification information. The identification information is separate (different) from an identifier indicating the switching on the primary paths 2,4. In some aspects, the identification is in a different form or logically different area than the switching identification.

For a wavelength switched transport network, the nodes of the primary paths 2,4 are configured to switch the optical signals based on the received wavelength of light. The additional LSP identification is different to the identifying wavelength. In some aspects, the identification (i.e. identification information) is in the data plane. The identification information is in any form or carrier associated with the data plane. The carrier may be any of an out-of-band signal, an in-band signal, e.g. an overhead.

In the example of FIGS. 3 and 4, the node A 22 of the first primary path and the node H 36 of the second primary path are pre-configured to re-route the traffic towards node E 30 in case of failure on a downstream link of the first or second primary path 2,4. The nodes of the alternate path are pre-configured to forward the signals along an identified alternate path.

For example, Node E is pre-configured to forward the traffic coming from node A 22 or node H 36 towards node F 32. Node F 32 receives both the signals on the first and second alternative paths 6,8 from the same interface of Node E. Node F 32 is not aware of the node on which the received signal originated (i.e. first or second alternative path 6,8), without the additional identification information. This identification information is required for node F 32 to determine the next hop for the incoming LSP. In this example, node F is pre-configured to forward the signal on the first alternative path 6 towards node C 26, and the signal on the second alternative path 8 towards node G 34.

In an example of the invention, the identification information is added by the node which routes the signal from the primary path onto the alternative path. In some aspects, the identification information is added into the data plane by the node which routes the signal from the primary path onto the alternative path. For example, the identification information is added by node A or node H in the examples of FIGS. 2 and 3. The identification information is not included until the alternative path is followed. Alternatively, the identification information is included in the data plane prior to the alternative path.

The node(s) 30,32 on the alternative path are configured to retrieve the identification information. The node(s) on the alternative path are configured to forward the signal on the appropriate interface towards the destination. For example, node F 32 receives signals on the first or second alternative paths at an input interface IF1. Based on the identification information, a processor of the node F 32 is configured to select an output interface IF2 or IF3 for a signal. The node(s) on the alternative path are arranged to forward the identification information. In one example, if the node on the alternative is forwarding the signal to the destination node, then the identification information is not forwarded to the destination node. Alternatively, the identification information is always forwarded.

An example of the invention is a computer program or computer program product configured to carry out the method of any aspect described, when executed by a computer or processor.

The identification information is any type of information which allows routing along the alternative path, for example, by providing a network level identification of a shared label. In some aspects, the identification information is unique for each label, e.g. lightpath. The identification information uniquely identifies the signal, for example, as a unique identifier for that network. The identification relates to the original path or the protection path. In particular, the identification of the original lightpath is an identifier for the primary LSP. Switching can be carried out based on the original label (LSP) and the additional identification information only.

In some aspects, the identification is connected to or includes the wavelength to which the identification information relates, such that the optical signal can be switched based on the wavelength and associated identification information.

According to the RSVP-TE standard, IETF RFC3209—"RSVP-TE: Extensions to RSVP for LSP Tunnels", a LSP can be uniquely identified on a network basis by a quintuple-key of:

Tunnel endpoint (egress) address
Tunnel ID
Extended Tunnel ID
Sender (ingress) address
LSP ID This quintuple key is an example of identification information. The identification information provides identification of the optical signal, in particular, a particular wavelength signal. The identification information provides identification of the label switched path. In particular, the identification information provides identification of the label switched path at the network level.

In some examples, all of the above identifiers are included. In another example, the identification information comprises one or more of the above identifiers. In some aspects, the identification information provides a unique identification, using as many keys or identifiers as needed for the type of network. In particular, the identification information is configured to identify the cross-connections on a switch. The quintuple key is an example only of the identification information, and other forms and identifiers for the identification information may be used.

The identification information is associated on each node to a cross-connection. A cross-connection is on each switching node. Each such cross-connection is associated to a particular value of identification information. A cross-connection is a physical link between two interfaces. Aspects of the invention allow sharing such interfaces, e.g. with lightpaths using the same wavelength. An intermediate node is configured with shared cross-connections and interfaces (IF), for example:

Cross-connection 1: IF1 with IF2 associated with identification information X Cross-connection 2: IF1 with IF3 associated with identification information Y There are in this case two different traffic flows that can arrive from IF1, The identification information provides the node with the information to select the correct cross-connection for the incoming traffic e.g. the cross-connection with IF2 or IF3. The cross-connections are controlled by a processor or other controller.

In some aspects, the nodes store a table of cross-connections. The table comprises the cross-connections, identified by a cross-connection identifier. The cross-connection identifier may be at node level. In some aspects, the cross-connection identifier is associated with the identification information, e.g. identifying the LSP. The node comprises a switching fabric or backplane configured to form the cross-connections and switch the signal.

The identification information functions as a key to identify a pre-configured cross-connection. For example, the identification information is a key for a cross-connection identifier or a key directly for stored cross-connections.

A cross-connection is for a particular label (i.e. lambda or wavelength for lambda-switching). Once the cross-connection is selected by the quintuple key, a normal or conventional label switching is used by the node. The primary path LSP label is used to identify which of the cross-connection is used. For example, conventional wavelength-switching identifies the cross-connection for a particular lambda according to its wavelength. Therefore, aspects of the present invention use both the identification information and label information from the primary LSP to perform the switching. The identification information selects the correct cross-connection on the alternative path, and the signal matched and switched with that cross-connection using the original (primary path) LSP, e.g. lambda or time. The signal can be considered as belonging to a primary LSP.

Aspects of the present invention provide a local recovery scheme for a lambda-switched or TDM switched network similar to Fast Re-Routing (FRR) in the packet layer. Although a packet header is not available, examples of the invention allow local protection routing to be made.

This identification information or identification is applicable to wavelength or lambda switched optical networks where the LSP is the lightpath (a.k.a. wavelength or optical channel) which is transparently sent from a source node to a destination node.

In an example of the invention, the identification information is included in the data plane, for example, an out-of-band data signal. For example, the identification information is included in an Optical Supervisory Channel (OSC). G.692 Recommendation, ITU-T G.692—"Optical interfaces for multi-channel systems with optical amplifier", defines the Optical Supervisory Channel (OSC) as a channel that is accessed at each optical line amplifier site that is used for maintenance purposes. The OSC is generally accessed by each node in the network, i.e. is not passed on transparently as the lightpath usually is.

In some aspects, the quintuple-key of a lightpath is statically configured in intermediate nodes. The propagating lightpath itself, remaining in the optical layer, cannot drop this information directly node by node. The additional information, in e.g. the OSC, provides for transmission of the additional information, e.g. quintuple key.

In practical implementations the standard OSC is an additional wavelength $\lambda_{OSC}$, usually outside the EDFA amplification band, (at 1510 nm, 1620 nm, 1310 nm or another proprietary wavelength). The OSC carries information about the DWDM optical signal as well as remote conditions at the optical terminal or amplifier site. The ITU standard suggests using an OC-3 signal structure, although different signal structures may be used. Unlike the 1550 nm band client signal-carrying wavelengths, the OSC is always terminated at intermediate amplifier sites (nodes), where local information is optionally received before re-transmission.

In an aspect of the present invention, the OSC is utilised to carry the identification information for use routing along an alternative path, for example, LSP identification. The OSC is an example of a data plane signal suitable to carry the identification information.

In an aspect of the invention, the identification information is carried as in-band data signal. In a further example, the identification information is carried in any header or overhead of the data plane. For example, the identification information may be in a frame header or overhead. The header or overhead may be at a level in a transport hierarchy which is terminated at each node In some examples, the lightpaths are transmitted in the Optical Transport Network (OTN) transport technology, as defined by ITU-T G.709. OTN uses WDM signals. The switch nodes may provide for switching at wavelength granularity or sub-wavelength granularity, e.g. an Optical channel Data Unit (ODU). For example, switching may be of an ODU1, ODU2, ODU3, ODU4, ODUk or other defined ODU or unit defined in OTN. The ODU is used as the basic multiplexing unit in the TDM hierarchy. Each of the ODU has a defined size, and a defined time over which the signal is transmitted. The ODU functions as a container to contain any type of supported client signal. In some aspects, the nodes are configured for time division multiplexed (TDM) switching. In some aspects, the nodes provide OTN layer switching, in particular, TDM switching of ODU level units.

The nodes providing OTN switching allow switching units of data at layer 1. This enables effective bypass of intermediate Internet Protocol (IP) routers. This is a relatively coarse switching granularity, between a fine granularity of routing on a per-packet basis and a very coarse routing of a whole wavelength as a unit. For example, OTN offers switching at the different ODU granularities that the OTN multiplexing hierarchy offers; 1.25, 2.5, 10, 40, and 100 Gb/s. In some aspects, the switching is in the electrical domain, allowing combining of ODU to fill the capacity. As mentioned above, OTN also provides for lambda (or Optical channel OCh) switching performed with optical cross-connects.

The Optical channel Data Units can be considered as switched according to label, i.e. in a LSP. In particular, the ODU are TDM switched. The label may be defined by a position or time of a switched unit in a TDM signal. Aspects of the present invention are applicable to OTN, for switching a wavelength level and switching at a sub-wavelength level, e.g. switching of ODUs.

The identification information can be carried in the OTN overhead or in an out-of-band control channel. The identification information may be in any suitable OTN overhead, e.g. an overhead of an Optical Multiplex Section (OMS), Optical Transport Section (OTS), Optical channel (OCh) or Optical Transport Unit (OTUk) layers. In some examples, the identification information is carried as in-band information. For example, the identification information is in an overhead of the ODU.

In some aspects, the identification information may be carried in a Direct Communication Channel (DCC), e.g. DCC0 or DCC1 header. The DCC is a part of the overhead of the optical signal. In some examples, there is a DCC for each data unit or lambda. Alternatively, the identification information is carried in an out of band channel, e.g. a control channel. The identification information may be carried separately for each data unit or lambda. Thus, aspects of the invention allow shared protection paths for OTN transport signals without requiring a control plane.

In a further example, aspects of the invention are applicable to a Synchronous Optical Networking (SONET) or Synchronous Digital Hierarchy (SDH) signal. The label may be defined by a position of a switched unit in the TDM signal, e.g. any suitable one of the defined frames or modules. The identification information is in an overhead of SONET or SDH. For example, the identification information is in a DCC of SONET/SDH. The nodes may be configured to handle SONET/SDH signals transported over a plurality of wavelengths by wavelength division multiplexing.

Aspects of the invention allow at least a part of the signal to be forwarded transparently, that is, maintained as an optical signal rather than conversion to electrical data. In other aspects, the signal is not forwarded transparently.

Figure 5:
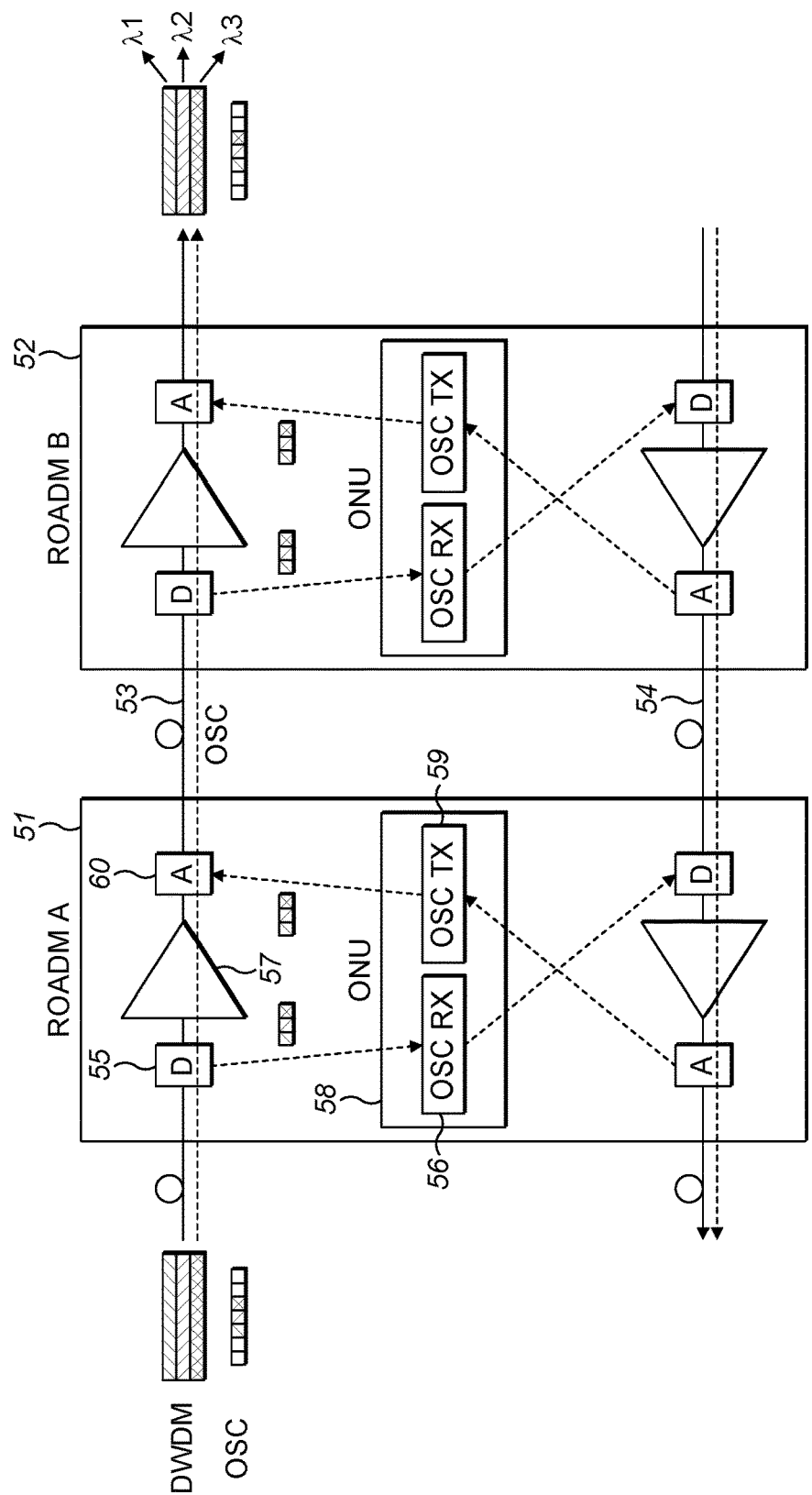
FIG. 5 shows an example of two nodes configured according to an example of the present invention.

FIG. 5 shows a first node 51 and a second node 52 according to an example of the invention. In this example, both nodes are ROADMs. The first and second nodes 51,52 are connected by one or more optical links, in this case two links 53,54. The first and second nodes 51,52 are bi-directional. Processes for one node in only one direction from the first to second node are described. The processes in the opposite direction and other node are substantially the same, carried out by another part of the node or other of the first and second nodes. In some aspects, the nodes comprise wavelength selective switching (WSS) components. In some aspects, the nodes 51,52 are configured to provide all optical switching. The optical signal is not converted to an electrical signal in order to perform the switching. The optical signals are switched at wavelength granularity. Alternatively, the nodes are configured for sub-lambda switching.

The first node 51 is configured to receive one or more lightpaths carrying data traffic. The first node 51 also receives the identification information. In this case, the identification information is carried by the OSC. A drop module 55 is configured to extract the data plane carrier of the identification information. A receive module 56 is configured to selectively receive the identification information, i.e. in the OSC. At least some of the remaining lightpaths are processed and/or amplified as an optional stage in a line amplifier 57.

A processor 58 is configured to extract the additional information, and based on the additional information, determine an output interface of each received lightpath. The node is pre-configured to associate particular values of the identification information with a particular output interface, i.e. node to which the signal should be forwarded. The identification information alone determines the cross-connection, which determines the output interface. In some examples, the nodes comprise storage or memory for storing the cross-connections, for example, in a table. The processor 58, or further processor, is configured to retrieve the cross-connections from the storage, based on the identification information.

A transmit module 59 is configured to forward the identification information carrier, e.g. OSC, to an add module 60. The add module 60 inserts the identification information carrier into the data plane of the output interface. In some examples, the transmission of the identification carrier may be with or without the identification information, depending on the node. In particular, if the node is the final node of the protection path, the identification information may not be included, since the following node does not require this information. In this case, the output interface transmits the signals to the second node 52. In some aspects, the lightpaths are switched transparently. Alternatively, the node 51,52 is configured to switch the lightpaths in an opaque or translucent manner. The receive module and transmit module are configured to extract and insert the identification information in any suitable form according to an example of the invention.

In an aspect of the present invention, the node is configured to insert the identification information into the identification information carrier and/or read the identification information from the identification information carrier. A general node on the alternative path will both read the identification information to determine where to forward the optical label switched path, and forward the signal and additional information on the path. A node of the primary path which initiates the protection path inserts the identification information into the identification information carrier (e.g. OSC). The identification information is determined from a memory or storage of the node, or obtained from the signal itself.

The identification information is only included in the identification information carrier (e.g. OSC) when required, e.g. when the protection path is used. The identification information is used on shared backup cross-connections, that is, when recovery is being performed. The cross-connections on the working paths are not shared, so there is a single signal that can use them, and the identification information is not required. Alternatively, the identification information is always in the identification information carrier, even on the working path when it is not needed.

In particular, a node on the protection path will read the identification information. The lightpath will be switched according to the pre-configured path based on the identification information, and in some aspects, the primary LSP e.g. lambda. For each lambda or TDM switched data unit there is a protection path.

According to an aspect of the invention, the nodes comprise pre-configured cross-connections. The cross-connections are pre-configured by a management plane, for example, an Operations support system (OSS), Network Management System (NMS) or manual local operator. In some aspects, the cross-connections can be considered as manually pre-configured. A control plane or distributed signalling is not used to configure the nodes. Thus, protection paths can be provided for networks without a control plane, or without using the control plane or distributed signalling of a network.

Figure 6:
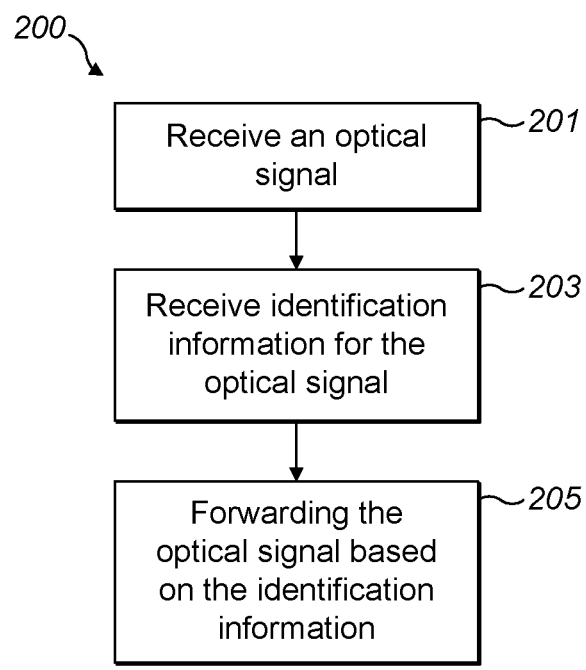
FIG. 6 shows a method of recovery in a node re-routing a signal onto an alternative path.

FIG. 6 shows an example method for a node on the alternative path, e.g. node E, F or G. The node receives the optical signal in 201. The node retrieves the identification information about the lightpath in 203, e.g. from the OSC or overhead. The signal was previously on a primary label switched path LSP. The alternative path node receives the signal directly from the primary path, or from another node of the alternative path. Thus, the node receives the signal which was at any time on the primary path.

In 205, the node forwards the signal, based on the identification information. The node is pre-configured with the cross-connection for the lightpath. The identification information is read by the node to select the cross-connection. The cross-connection may be optical or electrical. In particular, the identification information associates the label switched path with a particular cross-connection for a lambda or TDM identifier.

The node forwards the signal to the next node based on the cross-connection, as selected by the received identification information and the primary path label (e.g. lambda) received.

Figure 7:
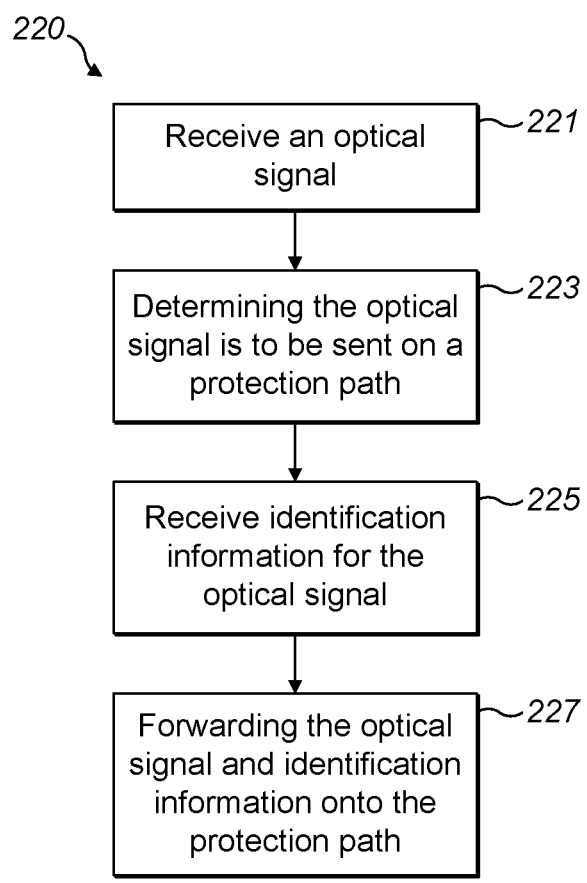
FIG. 7 shows a method of recovery in a node on an alternative path.

FIG. 7 shows an example method 220 for a node which functions as a point of repair, e.g. node A or node H in the above examples. The node is on the primary path. In some examples, the point of repair is the node immediately upstream of the failure. The node receives the optical signal in 221, and determines that the protection path is to be used in 223. For example, the node determines that a downstream link or connection is not functioning properly. The node is configured to make a local decision to divert the signal without any control plane or central entity intervention.

In 225, the node determines (e.g. retrieves or receives) the identification information, and injects the identification information, for example into the OSC or a data header. The lambdas and identification information are forwarded on the protection or alternative path, in 227. In some examples, the identification information is at least part of the quintuple key. The node acting as the point of repair re-routes the lightpath towards an adjacent node which is on the alternative path. The method of FIGS. 6 and 7 is described as an example with respect to an optical signal. In other aspects, the signal may not be optical, e.g. the signal may be an electrical or radio signal.

The alternative path for each primary path is pre-configured. The alternative path is used when a failure is detected without the use of a distributed signalling protocol. In particular, aspects of the invention do not require cross-connections along the recovery path to be created in real time by a signalling protocol. In some aspects, the alternative path is used when a failure is detected without the use of a control plane.

Aspects of the invention relate to a network which does not have a control plane which functions to provide local transport protection. For example, the network is a Software Defined Network (SDN) and/or in networks based on Open-flow, distributed signaling protocols are not used. In these cases, pre-provisioning of backup paths to the ingress nodes is substituted with a pre-provisioning of backup cross-connections on the nodes along the protection route, as described above.

In a further aspect of the invention, the network layer technology is MPLS Transport Profile (MPLS-TP). Such a network may use e.g. electrical or radio transmission, rather than optical, and so examples of the invention are not restricted to optical networks.

Aspects of the invention provide a resiliency mechanism with fast switchover of optical traffic within reduced outage in environments without a control plane. This allows evolving WDM from control plane to SDN and keeping the possibility of sharing resources in the protection domain among different (two or more) working LPSs. Examples of the invention provide a porting of the One-to-One FRR concept from Multi-Protocol Label Switching (MPLS) to WDM.

For TDM, aspects of the invention provide for the additional information to associate a particular time or TDM label with cross-connections on a particular path, substantially as described above. Any of the features described are applicable to TDM switching.

The invention does not require particular hardware modifications because it leverages on the wavelength blocking feature of wavelength selective switching (WSS) components in the nodes. In addition, aspects of the invention remove the need of power adjustments on the node immediately upstream of the failure.

Compared to traditional 1+1 mechanisms such as optical subnetwork connection protection (OSNCP), there is a saving of at least around 50% of the needed hardware because it is not required to duplicate the traffic at the source (dual transponder feature). The broadcast capability of the WSS components may be used to feed the traffic towards two or more directions.

Aspects of the invention can be defined with reference to lambda-switching or TDM switching. Alternatively, aspects of the invention can be defined on forwarding the signal on the alternative path based on the identification information and primary path LSP. Alternatively, the invention may be defined using any combination of features from any embodiment.

Aspects of the invention relate a node, network comprising a plurality of nodes, and methods of transport at, through or between nodes. An aspect of the invention is a switch element, switch module or switch as part of a larger node. Nodes may be configured for the described functions on both of the primary path and protection path, or the functions of only one of the primary path and protection path.

The processor may alternatively be described as a processing unit and/or comprise one more processors. The features described are functional, and an implementation of a node or network is not limited to the particular units or components described.

For example, any unit may be integrated, distributed or separate from any other unit described. Any of the functions described may be implemented in software, firmware or hardware.

The invention claimed is:

1. A method of local path protection in a node on a shared alternative path of a network, comprising:
receiving a signal that was previously switched on a primary label switched path (LSP), wherein the signal is switched by at least one of lambda-switching and time-division multiplex (TDM) switching;
receiving identification information arranged to identify the signal; and
forwarding the signal on the shared alternative path, instead of forwarding the signal on the primary LSP, based on the identification information.

2. The method as claimed in claim 1, wherein the forwarding the signal on the shared alternative path is based on the identification information and the primary (LSP).

3. The method as claimed in claim 1, wherein the signal is a lambda or a time-division multiplexed data unit.

4. The method as claimed in claim 1, wherein the identification information is in a data plane.

5. The method as claimed claim 1, wherein the identification information is configured to identify the primary label switched path at a network level.

6. The method as claimed in claim 1, wherein a cross-connection of the node on the shared alternative path is associated with the identification information, such that the cross-connection is selected based on the received identification information.

7. The method as claimed in claim 1, wherein the node of the shared alternative path is pre-configured with cross-connections, and the identification information received with the signal determines which of the cross-connections is used by the node of the shared alternative path to forward the signal on the alternative path.

8. The method as claimed in claim 1, wherein nodes of the shared alternative path are pre-configured by a management plane.

9. The method as claimed in claim 1, wherein the signal is a time-division multiplexed Optical channel Data Unit (ODU) in an Optical Transport Network (OTN) network.

10. The method as claimed in claim 1, wherein the identification information comprises a quintuple key identifier.

11. The method as claimed in claim 1, wherein the signal is part of a wavelength division multiplexed WDM optical signal.

12. A node configured for a shared alternative path of a network, the node comprising:
- an input interface configured to receive a signal that was previously switched on a primary label switched path (LSP), wherein the signal is switched by at least one of lambda-switching and time-division multiplex TDM switching;
- an output interface configured to forward the signal on the shared alternative path; and
- a processor configured to:
  - receive identification information arranged to identify the signal, and
  - select the output interface, instead of an interface configured to forward the signal on the primary LSP, based on the identification information.

13. The node as claimed in claim 12, wherein the node of the alternative path is pre-configured with cross-connections, and wherein the processor is configured to receive the identification information associated with the signal to determine which of the cross-connections is used by the node of the alternative path to forward the signal.

14. The node as claimed in claim 12, further comprising a cross-connection of the node on the shared alternative path is associated with the identification information, such that the cross-connection is selected based on the received identification information.

15. The node as claimed in claim 12, wherein the node of the shared alternative path is pre-configured with cross-connections, and the identification information received with the signal determines which of the cross-connections is used by the node of the shared alternative path to forward the signal.

16. A method of local path protection in a node on a primary path of a network, comprising:
- receiving a signal switched on the primary label switched path (LSP), wherein the signal is switched by at least one of lambda-switching and time-division multiplex TDM switching;
- determining that the signal is to be sent on an alternative path; and
- forwarding on the alternative path the signal and identification information arranged to identify the signal, wherein the signal is further to be forwarded, based on the identification information, at a node of an alternative shared path instead of being forwarded on the primary LSP.

17. The method as claimed in claim 16, wherein the forwarding on the alternative path of the signal is based on the identification information and the primary (LSP).

18. The method as claimed in claim 16, wherein the identification information is on a data plane.

19. The method as claimed claim 16, wherein the identification information is configured to identify the primary label switched path at a network level.

20. A node configured for a primary path of a network, the node comprising:
- an input interface configured to receive a signal switched with a label switched path LSP;
- a processor configured to determine identification information of the signal; and
- an output interface configured to transmit the signal and identification information on an alternative path, wherein the signal is further to be forwarded, based on the identification information, at a node of an alternative shared path instead of being forwarded on the primary LSP.

21. The node as claimed in claim 20, wherein the node is pre-configured with cross-connections wherein the output interface is configured to transmit identification information associated with the signal to determine which of the cross-connections is used by the node to forward the signal.

* * * * *